United States Patent
Minami

(10) Patent No.: US 10,048,680 B2
(45) Date of Patent: Aug. 14, 2018

(54) ROBOT SYSTEM, ROBOT TEACHING METHOD AND CONTROL DEVICE THEREFOR

(71) Applicant: KABUSHIKI KAISHA YASKAWA DENKI, Kitakyushu-shi (JP)

(72) Inventor: Takashi Minami, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 576 days.

(21) Appl. No.: 14/830,687

(22) Filed: Aug. 19, 2015

(65) Prior Publication Data

US 2016/0055425 A1    Feb. 25, 2016

(30) Foreign Application Priority Data

Aug. 20, 2014    (JP) .................................. 2014-167624

(51) Int. Cl.
  *G06F 19/00*   (2018.01)
  *G05B 19/425*  (2006.01)

(52) U.S. Cl.
  CPC .. *G05B 19/425* (2013.01); *G05B 2219/39136* (2013.01); *G05B 2219/40307* (2013.01); *G05B 2219/40387* (2013.01); *Y10S 901/03* (2013.01); *Y10S 901/14* (2013.01)

(58) Field of Classification Search
  None
  See application file for complete search history.

(56) References Cited

U.S. PATENT DOCUMENTS

| 7,292,002 | B2 | 11/2007 | Watanabe et al. |
| 7,905,699 | B2 | 3/2011 | Sueyoshi et al. |
| 8,596,950 | B2 | 12/2013 | Sueyoshi et al. |
| 8,688,261 | B2 | 4/2014 | Hirota |
| 2012/0141235 | A1 | 6/2012 | Krupyshev et al. |

FOREIGN PATENT DOCUMENTS

| CN | 1778031 | 5/2006 |
| CN | 103476551 | 12/2013 |
| JP | 2002-313872 | 10/2002 |
| JP | 2009-0136981 | 6/2009 |
| KR | 10-2011-0021941 | 3/2011 |
| KR | 10-2012-0051757 | 5/2012 |

OTHER PUBLICATIONS

Chinese Office Action for corresponding CN Application No. 201510512326.7, dated Dec. 2, 1016.
Korean Office Action for corresponding KR Application No. 10-2015-0116692, dated Jan. 19, 2017.

*Primary Examiner* — Bhavesh V Amin
(74) *Attorney, Agent, or Firm* — Mori & Ward, LLP

(57) ABSTRACT

A robot system includes a robot including a robot arm, and a first hand and a second hand which are connected to the robot arm and which are provided to independently rotate about an axis on the robot arm; and a controller configured to control an operation of the robot. When the robot arm and the first hand are operated so that the first hand reaches a predetermined target position, teaching values for the first hand in the target position is generated. When the first hand and the second hand are rotated based on the teaching values for the first hand, a relative error in rotation amount around the axis between the first hand and the second hand is acquired and stored in a memory. Teaching values for the second hand is generated from the teaching values for the first hand based on the acquired relative error.

20 Claims, 14 Drawing Sheets

ROBOT SYSTEM, ROBOT TEACHING METHOD AND CONTROL DEVICE THEREFOR

CROSS-REFERENCE TO RELATED APPLICATION

The present disclosure contains subject matter related to that disclosed in Japanese Priority Patent Application No. 2014-167624 filed with the Japan Patent Office on Aug. 20, 2014, the entire contents of which are incorporated herein by reference.

BACKGROUND OF THE INVENTION

Field of the Invention

Embodiments disclosed herein relates to a robot system and a robot teaching method.

Description of the Related Art

Conventionally, there is known a robot system that performs a teaching work with respect to a robot.

In an related art, there is known a system performing a teaching work with respect to a transfer robot which includes a plurality of arms (corresponding to robot hands) (hereinafter referred to as "hands") and which transfers a substrate such as a semiconductor wafer or the like while holding the substrate with each of the hands (see, e.g., Japanese Patent Application Publication No. 2002-313872).

Specifically, in the related art, a reference unit serving as a reference of position adjustment is first decided. Position data of the respective hands are grasped by causing all the hands to perform the transfer of substrates to the reference unit. Differences between the position data of the respective hands are calculated and deviations between the hands are corrected.

However, in the related art mentioned above, there is a room for further improvement in terms of efficiently performing a teaching work.

Specifically, in the related art, the teaching work using the reference unit needs to be performed at least once for all the hands. This is problematic in that it is difficult to efficiently perform the teaching work.

SUMMARY OF THE INVENTION

In accordance with an aspect of an embodiment, there is provided a robot system, including: a robot having a robot arm, and a first hand and a second hand which are connected to the robot arm and which are provided to independently rotate about an axis on the robot arm; and a controller configured to control an operation of the robot, wherein the controller contains: a memory unit; a first generation unit configured to, when the robot arm and the first hand are operated so that the first hand reaches a predetermined target position, generate teaching values for the first hand in the target position; an error acquiring unit configured to, when the first hand and the second hand are rotated based on the teaching values for the first hand, acquire a relative error in rotation amount around the axis between the first hand and the second hand and store the acquired relative error in the memory unit; and a second generation unit configured to generate teaching values for the second hand from the teaching values for the first hand based on the acquired relative error.

In accordance with another aspect of the embodiment, there is provided a robot teaching method for teaching a robot containing a robot arm, and a first hand and a second hand which are connected to the robot arm and which are provided to independently rotate about an axis on the robot arm, the method including: generating teaching values for the first hand in a predetermined target position by operating the robot arm and the first hand so that the first hand reaches the predetermined target position; rotating, based on the teaching values for the first hand, the first hand and the second hand, acquiring a relative error in rotation amount around the axis between the first hand and the second hand, and storing the acquired relative error; and generating teaching values for the second hand from the teaching values for the first hand based on the acquired relative error.

In accordance with still another aspect of the embodiment, there is provided a control device for controlling an operation of a robot including a robot arm, and a first hand and a second hand which are connected to the robot arm and which are provided to independently rotate about an axis on the robot arm, the control device containing: a storage unit; and a control unit, wherein the control unit has: a first generation unit configured to, when the robot arm and the first hand are operated so that the first hand reaches a predetermined target position, generate teaching values for the first hand in the target position; an error acquiring unit configured to, when the first hand and the second hand are rotated based on the teaching values for the first hand, acquire a relative error in rotation amount around the axis between the first hand and the second hand and store the acquired relative error in the storage unit; and a second generation unit configured to generate teaching values for the second hand from the teaching values for the first hand based on the acquired relative error.

DESCRIPTION OF THE EMBODIMENTS

Embodiments of a robot system and a robot teaching method disclosed herein will now be described in detail with reference to the accompanying drawings. The present disclosure is not limited to the embodiments to be described below.

Hereinafter, description will be made by taking, as an example, a case where a robot is a substrate transfer robot which transfers a wafer as a transferred object. The wafer will be designated by reference symbol "W".

A first embodiment will be described with reference to FIGS. 1 to 8 by taking, as an example, a case where a teaching work is performed based on a relative error about a common axis between a first hand and a second hand which are provided to independently rotate about the common axis. Furthermore, a second embodiment will be described with reference to FIG. 9 by taking, as an example, a case where a change in the relative error during the actual operation of a robot system is monitored at a predetermined timing.

First Embodiment

Figure 1:
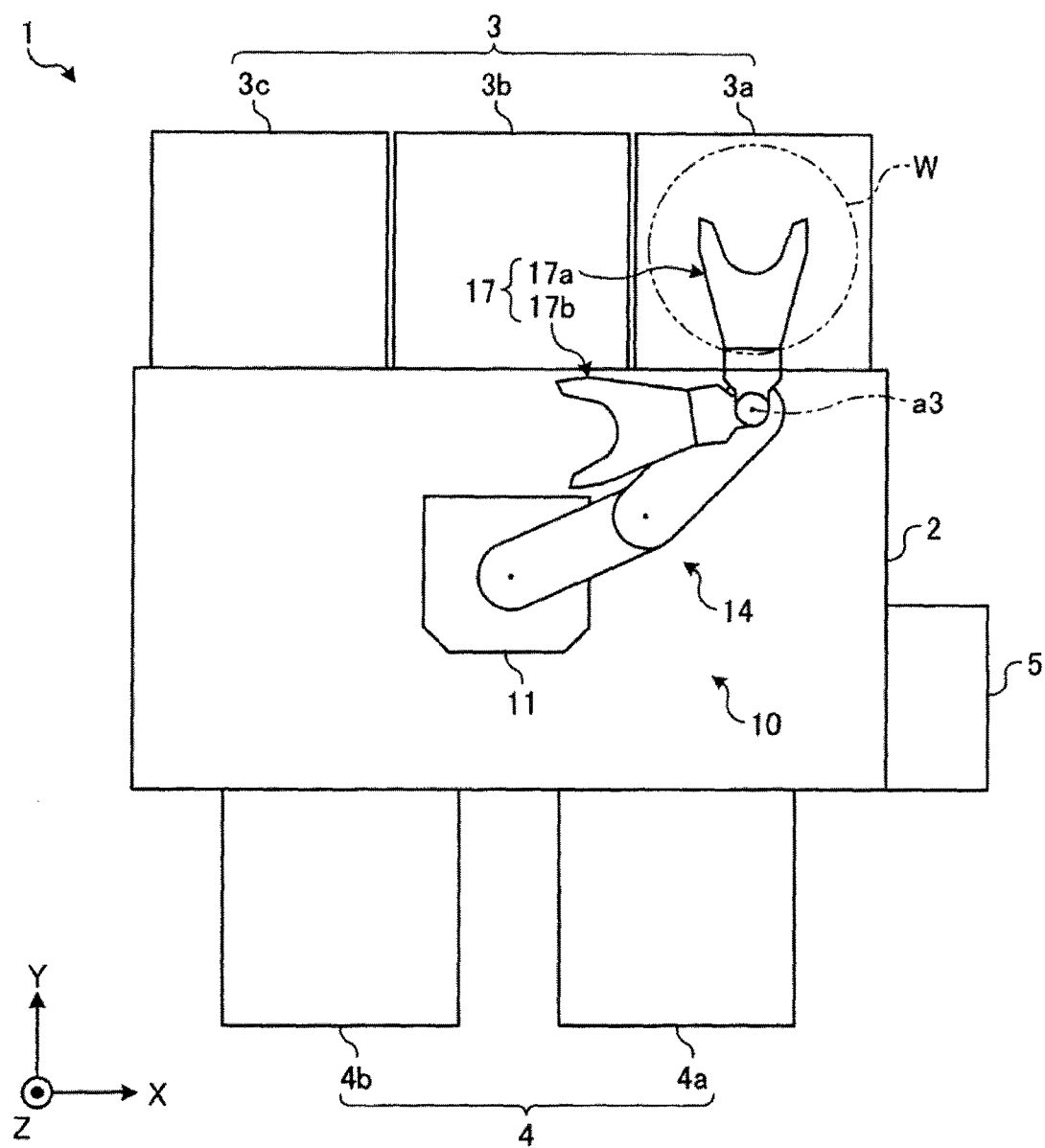
FIG. 1 is a schematic plan view illustrating one example of a configuration of a robot system according to a first embodiment.

First, one example of a configuration of a robot system 1 according to the first embodiment will be described with reference to FIG. 1. FIG. 1 is a schematic plan view illustrating one example of the configuration of the robot system 1 according to the first embodiment.

In order to facilitate understanding of the description, a three-dimensional rectangular coordinate system including a Z axis whose positive direction extend vertically upward and whose negative direction extends vertically downward is indicated in FIG. 1. Thus, the direction extending along an X-Y plane indicates a "horizontal direction". This rectangular coordinate system is sometimes indicated in other drawings used in the following descriptions.

As illustrated in FIG. 1, the robot system 1 includes a transfer chamber 2, a substrate supply part 3, a substrate processing part 4 and a control device 5. A robot 10 is disposed within the transfer chamber 2.

The transfer chamber 2 is a so-called equipment front end module (EFEM). The transfer chamber 2 is provided with a filter unit (not illustrated) and is configured to form a down-flow of a clean air with the filter unit. By virtue of the down-flow, the interior of the transfer chamber 2 is kept highly clean during the actual operation of the robot system 1.

The robot 10 includes a robot arm 14 having hands 17 each capable of holding a wafer W which is a target object to be transferred. The robot arm 14 is vertically movable and horizontally swivelably supported with respect to a base 11 provided on a base installation frame (not illustrated) which constitutes a floor wall portion of the transfer chamber 2.

As illustrated in FIG. 1, two hands 17a and 17b may be provided in the robot arm 14 so that the hands 17a and 17b can be independently rotated about an axis a3. By holding and transferring wafers W with the hands 17a and 17b, it is possible to improve the transfer efficiency of the wafers W.

In the following descriptions, the hand 17a will be regarded as an upper hand and the hand 17b will be regarded as a lower hand. The hand 17a will be referred to as a "first hand 17a". The hand 17b will be referred to as a "second hand 17b". Details of the robot 10 will be described later with reference to FIG. 2.

The substrate supply part 3 includes front opening unified pods (FOUPs) 3a, 3b and 3c each capable of accommodating a plurality of wafers W at multiple stages in the Z-axis direction and a FOUP opener (not illustrated) configured to open a lid of each of the FOUPs 3a, 3b and 3c so that the wafers W can be taken out into the transfer chamber 2.

The substrate processing part 4 is a processing part configured to perform predetermined semiconductor manufacturing processes such as, e.g., a cleaning process, a film forming process and a photolithography process, on the wafers W. The substrate processing part 4 includes processing apparatuses 4a and 4b which perform the predetermined processes.

The processing apparatuses 4a and 4b are disposed on, e.g., one side surface of the transfer chamber 2, so as to face the substrate supply part 3 with the robot 10 interposed therebetween. In FIG. 1, there is illustrated a case where the substrate supply part 3 and the substrate processing part 4 are disposed to face each other. However, the positional relationship of the substrate supply part 3 and the substrate processing part 4 is not limited thereto.

For example, the substrate supply part 3 and the substrate processing part 4 may be disposed side by side on the same side surface of the transfer chamber 2 or may be disposed on two side surfaces that do not face each other.

In FIG. 1, there is illustrated a case where the substrate supply part 3 includes three FOUPs 3a, 3b and 3c and where the substrate processing part 4 includes two processing apparatuses 4a and 4b. However, the number of the FOUPs 3a, 3b and 3c and the number of the processing apparatuses 4a and 4b are not limited thereto.

The control device 5 is one example of a controller connected to various kinds of apparatuses or parts, such as the robot 10 and the like, which constitute the robot system 1, in an information-transferable manner and configured to control the operations of the various kinds of apparatuses or parts.

For example, the control device 5 enables the robot 10 to perform an operation of moving the robot arm 14 up and down or an operation of swiveling the robot arm 14 and causes the robot 10 to take out the wafers W existing within the FOUP 3a, 3b or 3c into the transfer chamber 2 and to load the wafers W into the processing apparatus 4a or 4b.

Furthermore, the control device 5 enables the robot 10 to unload and transfer the wafers W, which have been subjected to a specified process in the processing apparatus 4a or 4b, and to re-accommodate the wafers W within the FOUP 3a, 3b or 3c.

In FIG. 1, there is illustrated a single-housing control device 5 disposed outside the transfer chamber 2. However, the control device 5 may be disposed inside the transfer chamber 2 and may be configured by a plurality of housings associated with the various kinds of apparatuses or parts to be controlled.

The control of various kinds of operations of the robot 10 is performed by the control device 5 based on teaching values generated by a prior teaching work and stored in an internal memory of the control device 5.

According to the related art, if there are provided two hands just like the first hand 17a and the second hand 17b as like the present embodiment, it is necessary to individually perform teaching works with respect to the operations of the first hand 17a and the second hand 17b.

This is because, even if the first hand 17a and the second hand 17b are disposed around a common axis, they have individual differences attributable to mechanical errors or assembly errors. For that reason, the teaching works become cumbersome.

In the present embodiment, one of the two hands (e.g., the first hand 17a) is used as a reference hand. A teaching work is performed with respect to only the first hand 17a which is the reference hand. Thus, the teaching values for the first hand 17a are first generated.

Furthermore, in the present embodiment, a relative error about the axis a3 between the first hand 17a and the second hand 17b is detected. Teaching values for the other hand (the second hand 17b in the present embodiment) are generated from the teaching values for the first hand 17a based on the relative error thus detected.

This eliminates the need to individually perform teaching works with respect to the operations of the first hand 17a and the second hand 17b. It is therefore possible to efficiently perform a teaching work.

Figure 2:
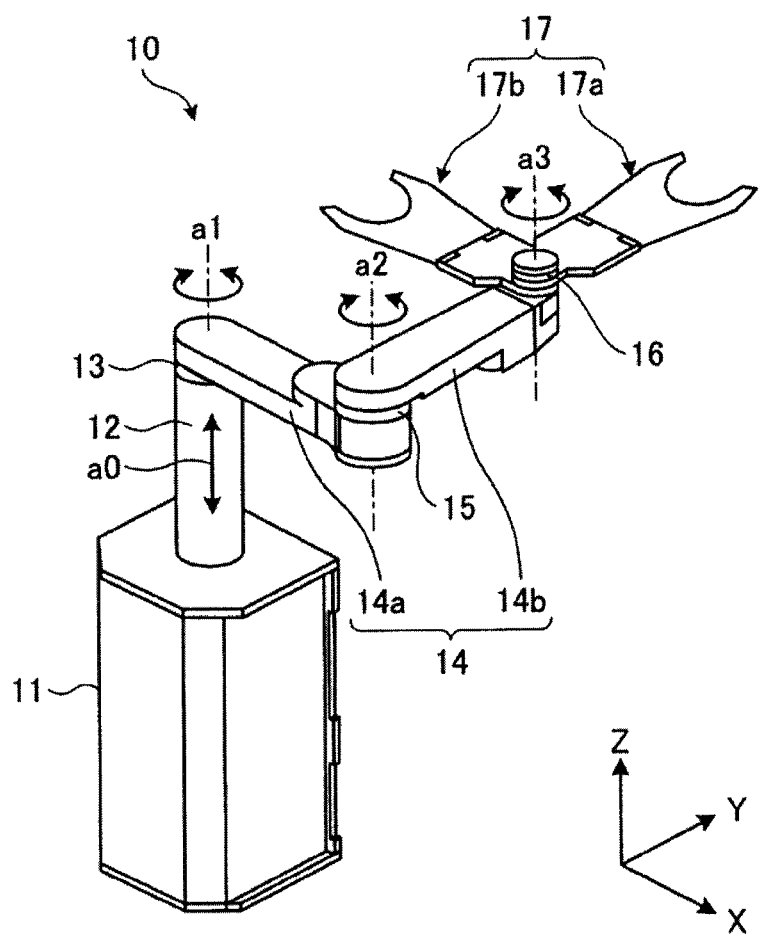
FIG. 2 is a schematic perspective view of a robot.

The robot system 1 according to the first embodiment will now be described in more detail with reference to FIGS. 2 to 8. FIG. 2 is a schematic perspective view of the robot 10.

As illustrated in FIG. 2, the robot 10 includes a base 11, a lifting unit 12, a first joint unit 13, a robot arm 14, a second joint unit 15, a third joint unit 16 and hands 17. The robot arm 14 includes a first arm 14a and a second arm 14b. The hands 17 include a first hand 17a and a second hand 17b.

The base 11 is a base unit of the robot 10 and is fixed to the aforementioned base installation frame. Alternatively, the base 11 may be fixed to the side wall surface of the transfer chamber 2 or may be fixed to an apparatus on the top surface of the transfer chamber 2. The lifting unit 12 is provided so as to slide in the vertical direction (the Z-axis direction) with respect to the base 11 (see arrow a0 in FIG. 2) and is configured to move the robot arm 14 up and down along the vertical direction.

The first joint unit 13 is a pivot joint which is rotatable about an axis a1. The first arm 14a is rotatably connected to the lifting unit 12 through the first joint unit 13 (see an arrow around the axis a1 in FIG. 2).

The second joint unit 15 is a pivot joint which is rotatable about an axis a2. The second arm 14b is rotatably connected to the first arm 14a through the second joint unit 15 (see an arrow around the axis a2 in FIG. 2).

The third joint unit 16 is a pivot joint which is rotatable about an axis a3. The first hand 17a and the second hand 17b are independently rotatably connected to the free end of the second arm 14b, i.e., the tip side of the robot arm 14, through the third joint unit 16 (see an arrow around the axis a3 in FIG. 2).

The robot 10 is equipped with a drive power source (not illustrated) such as a servo motor or the like. Each of the first joint unit 13, the second joint unit 15 and the third joint unit 16 is rotated by the operation of the drive power source.

Each of the hands 17 is an end effector configured to hold a wafer W by, for example, vacuum-sucking the wafer W. Details of the configuration of the hands 17 will be described later with reference to FIG. 3.

In FIG. 2, there is illustrated a case where the robot 10 includes two hands 17, i.e., the first hand 17a and the second hand 17b. However, the number of the hands 17 is not limited thereto but may be three or more.

Under the operation control executed by the aforementioned control device 5, the robot 10 performs a transfer operation for the transfer of the wafer W by combining the lifting operation of the lifting unit 12 and the rotating operations of the first arm 14a, the second arm 14b and the hands 17. The operation control of the control device 5 is executed by, for example, transmitting an operation signal, which rotates the aforementioned drive power source by an arbitrary angle, to the robot 10.

Figure 3:
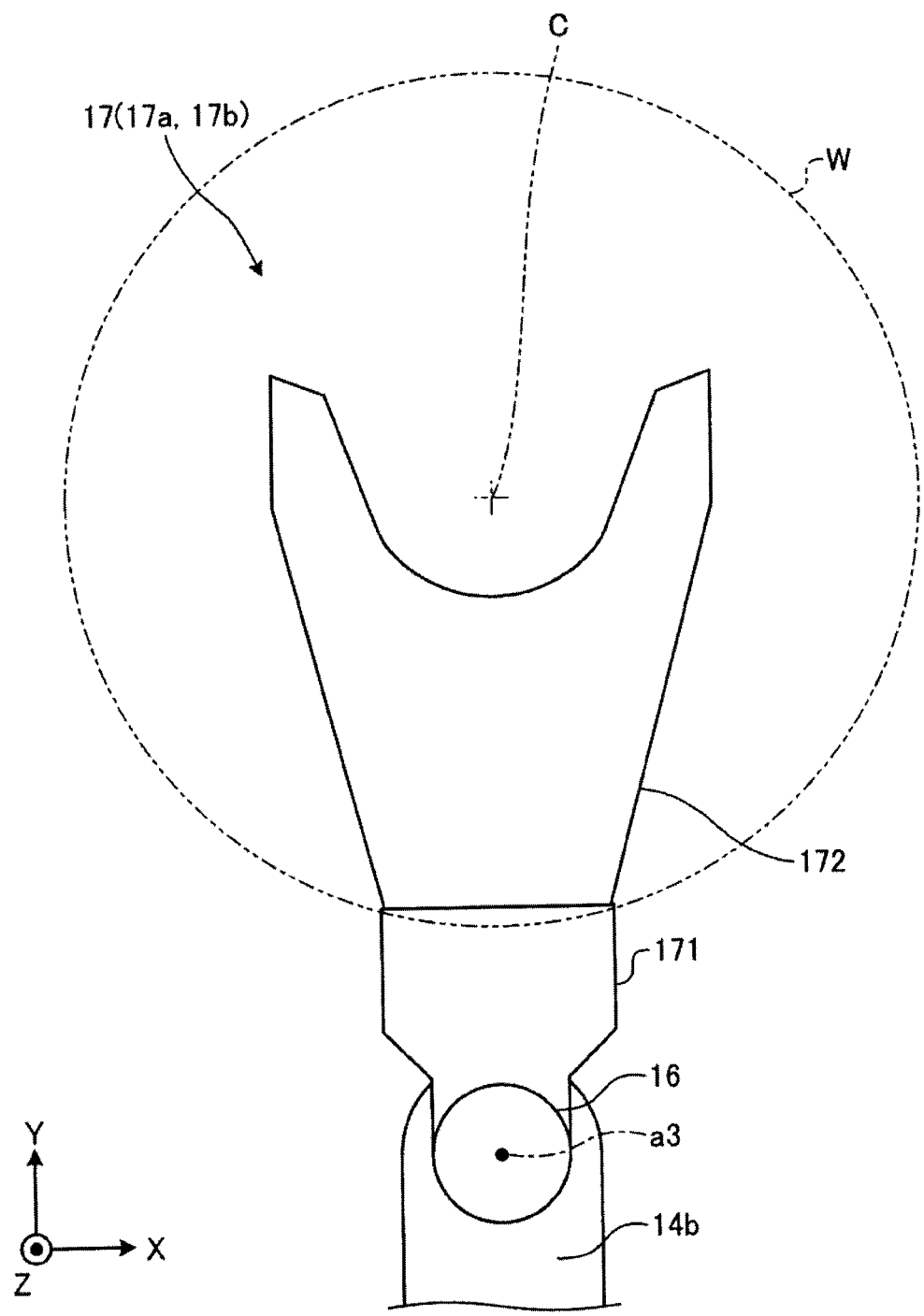
FIG. 3 is a schematic plan view of a hand.

Next, the configuration of the hands 17 will be described with reference to FIG. 3. FIG. 3 is a schematic plan view of the hands 17. In FIG. 3, the hands 17 are illustrated in such a state that the first hand 17a and the second hand 17b overlap with each other so that the contour lines thereof match with each other when seen in a plan view. The first hand 17a and the second hand 17b differ only in attachment height position from each other and remain the same in other configurations.

In FIG. 3, an imaginary wafer W held by one of the hands 17 and located in a prescribed position is indicated by a double-dot chain line. Reference symbol "C" designates the center of the wafer W.

As illustrated in FIG. 3, the hands 17 are provided in the tip portion of the second arm 14b through the third joint unit 16 so that the hands 17 can rotate about the axis a3. Each of the hands 17 includes a plate support portion 171 and a plate 172.

The power source unit is connected to the third joint unit 16 so as to support the plate 172. The plate 172 is a member equivalent to a base portion of each of the hands 17 and is made of ceramics, etc. In FIG. 3, there is illustrated the plate 172 whose tip side has a bifurcated shape. However, the shape of the plate 172 is not limited thereto.

While not illustrated in FIG. 3, each of the hands 17 may further include a holding member configured to hold the wafer W. As the holding member, it may be possible to use various types of holding members, e.g., a holding member of the type that grips an edge of the wafer W, a holding member of the type that vacuum-sucks the wafer W, or a holding member of the type that holds the wafer W merely by a frictional force.

In the present embodiment, when performing a teaching work to the first hand 17a serving as a reference and when detecting a relative error around the axis a3 between the first hand 17a and the second hand 17b, two kinds of jigs called a "wafer jig" (a to-be-detected jig) and a "sensor jig" (a detecting jig) are used. The "wafer jig" is one example of a first jig. The "sensor jig" is one example of a second jig.

Figure 4A:
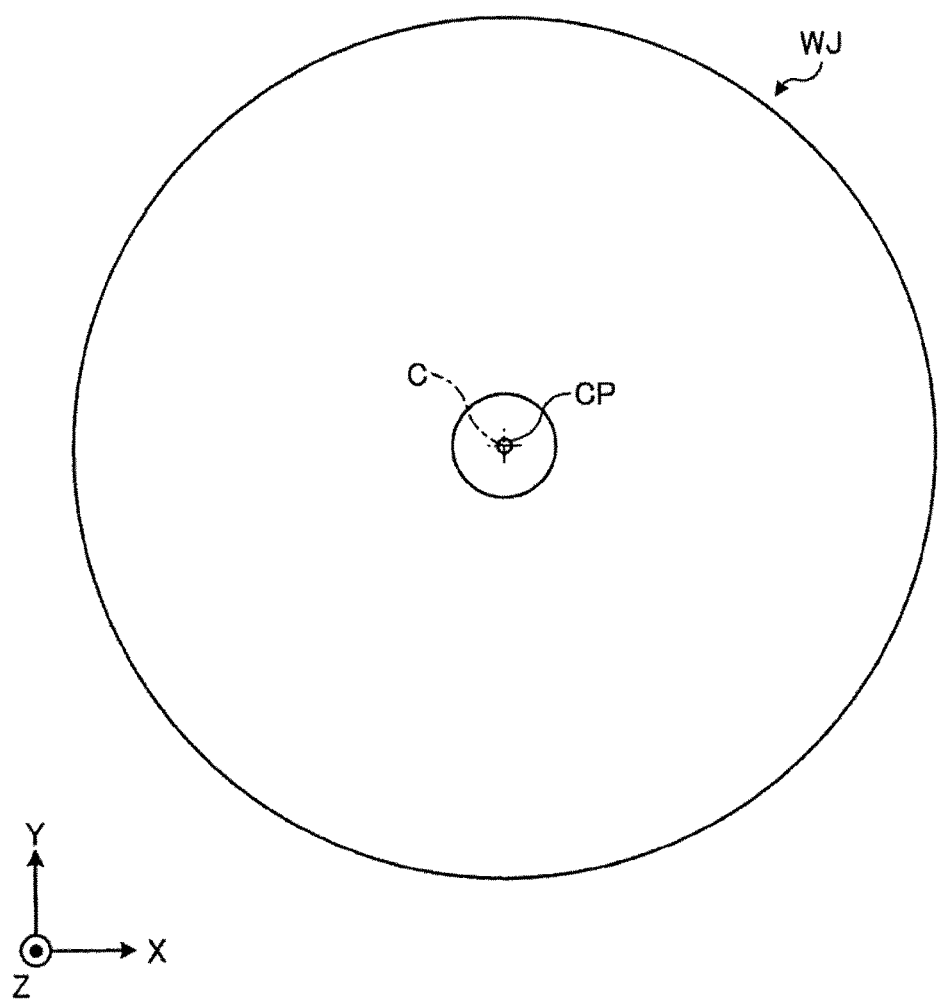
FIG. 4A is a schematic plan view of a wafer jig.
Figure 4B:
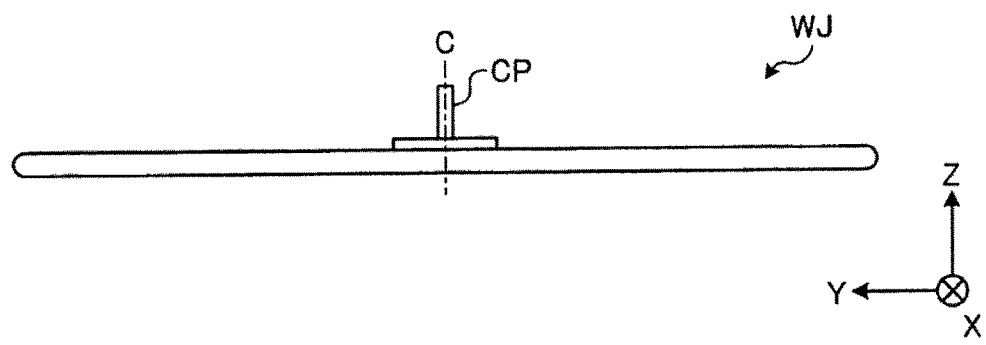
FIG. 4B is a schematic side view of the wafer jig.
Figure 4C:
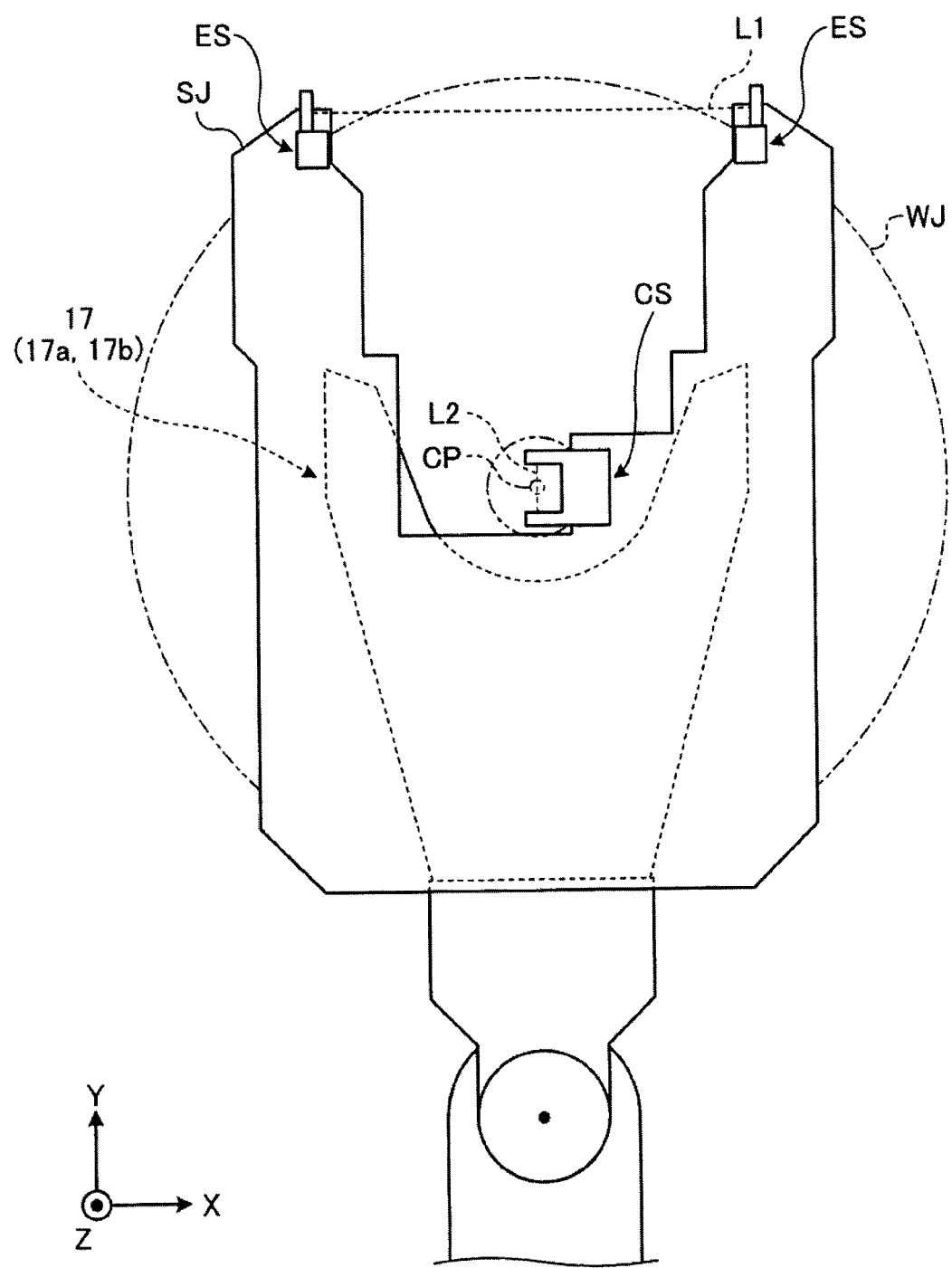
FIG. 4C is a schematic plan view of a sensor jig.

Next, these jigs will be described with reference to FIGS. 4A to 4C. FIG. 4A is a schematic plan view of a wafer jig WJ. FIG. 4B is a schematic side view of the wafer jig WJ. FIG. 4C is a schematic plan view of a sensor jig SJ.

First, descriptions will be made on the wafer jig WJ. The wafer jig WJ is a jig that has a shape of the wafer W and is mounted at the detected side. Specifically, when performing a teaching work to the first hand 17a serving as a reference, the wafer jig WJ is disposed at a location which becomes a predetermined teaching target position (teaching position), for example, in a desired teaching position which exists within the aforementioned FOUP 3a, 3b or 3c.

When detecting a relative error around the axis a3 between the first hand 17a and the second hand 17b, the wafer jig WJ is mounted in a prescribed wafer-mounting position on the second hand 17b.

Specifically, as illustrated in FIGS. 4A and 4B, the wafer jig WJ is formed in a shape substantially identical with the shape of the wafer W. The wafer jig WJ includes a center pin CP. The center pin CP is one example of an indicator portion.

The center pin CP is a pin-shaped member which has an axis overlapping with the center C of the wafer W and which extends in the Z-axis direction. The center pin CP is a member for determining an X-axis position in a teaching position.

Subsequently, descriptions will be made on the sensor jig SJ. The sensor jig SJ is a jig mounted at a detecting side. Specifically, the sensor jig SJ is mounted to the first hand 17a when performing a teaching work to the first hand 17a serving as a reference and when detecting a relative error between the first hand 17a and the second hand 17b.

Specifically, as illustrated in FIG. 4C, the sensor jig SJ includes two kinds of sensors, namely edge sensors ES and a center sensor CS. In order to facilitate understanding of the arrangement relationship, similar to FIG. 3, FIG. 4C illustrates the hands 17 in such a state that the first hand 17a, to which the sensor jig SJ is mounted, overlaps with the second hand 17b. Furthermore, it is assumed that the wafer jig WJ is mounted to the second hand 17b.

In the arrangement relationship illustrated in FIG. 4C, the edge sensors ES are provided so as to form an optical axis L1 parallel to the X axis and are used to detect an edge of the wafer jig WJ.

In the arrangement relationship illustrated in FIG. 4C, the center sensor CS is disposed in a position corresponding to the center pin CP of the wafer jig WJ and is provided so as to form an optical axis L2 parallel to the Y axis. The center sensor CS is used to detect the center pin CP.

Detailed operations of the robot arm 14 during the teaching work to the first hand 17a or the detection of the relative error between the first hand 17a and the second hand 17b using the wafer jig WJ and the sensor jig SJ will be described later with reference to FIGS. 6A to 7G.

Figure 5:
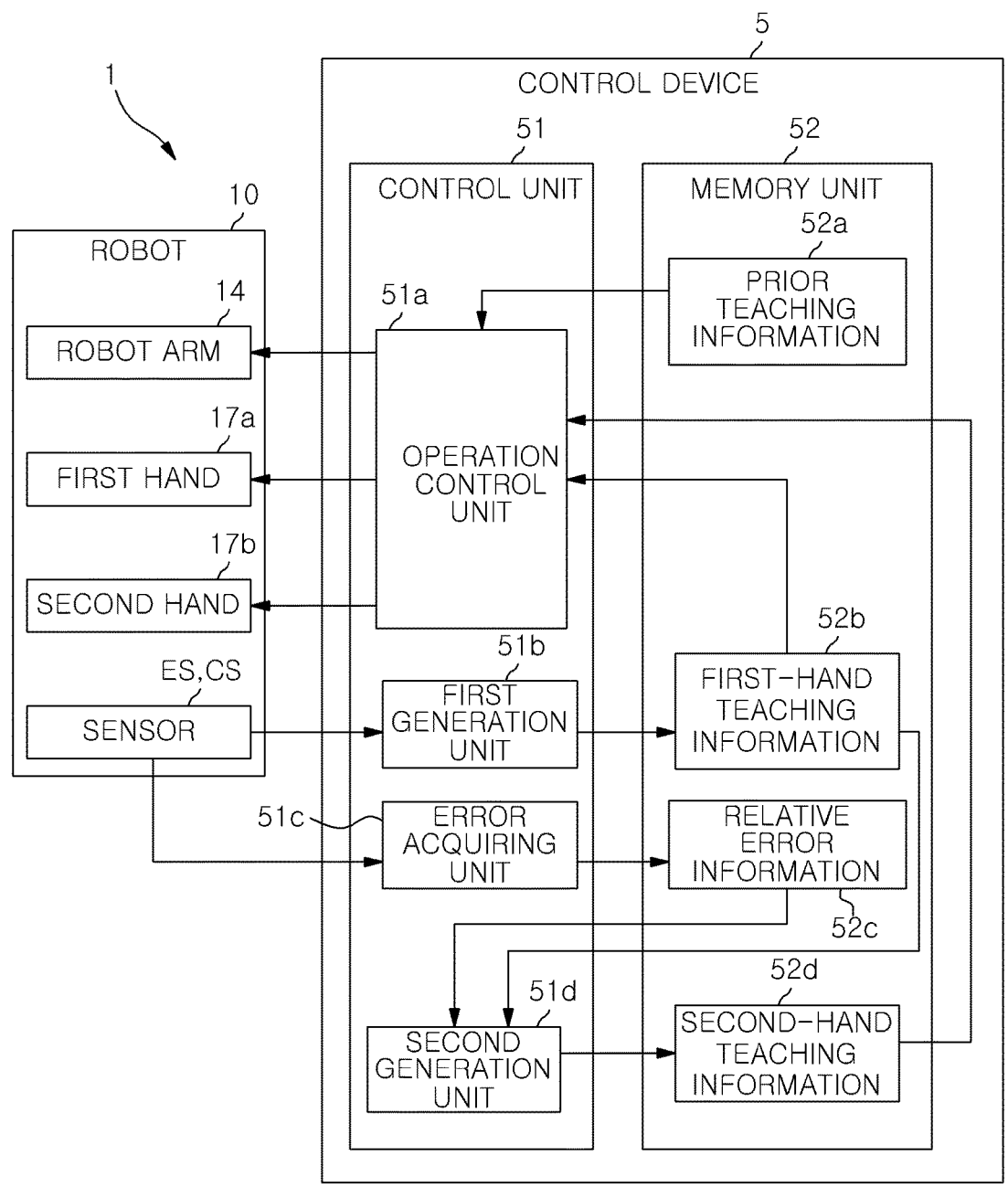
FIG. 5 is a block diagram of the robot system according to the first embodiment.

Next, the configuration of the robot system 1 according to the first embodiment will be described with reference to FIG. 5. FIG. 5 is a block diagram of the robot system 1 according to the first embodiment. In FIG. 5, there are illustrated the exemplary components required in describing the robot system 1. Illustration of general components is omitted.

Descriptions made with reference to FIG. 5 will be focused on the respective function blocks of the control device 5 that works when generating the teaching values of the first hand 17a and the second hand 17b and the actions between the respective function blocks. Thus, there may be a case where descriptions on the respective apparatuses or parts illustrated in FIG. 1 are simplified or omitted. In the descriptions made with reference to FIG. 5, there may be a case where the edge sensors ES and the center sensor CS described above are generically referred to as "sensors ES and CS".

As illustrated in FIG. 5, the control device 5 includes an control unit 51 and a memory unit 52. The control unit 51 includes an operation control unit 51a, a first generation unit 51b, an error acquiring unit 51c and a second generation unit 51d.

The memory unit 52 is a memory device such as a hard disk drive or a nonvolatile memory. The memory unit 52 stores prior teaching information 52a, first-hand teaching information 52b, relative error information 52c and second-hand teaching information 52d. The memory unit 52 may be a volatile memory. In this case, the memory unit 52 may be configured as a memory device communicating with a nonvolatile memory provided in a device other than the control device 5, e.g., a system server.

The prior teaching information 52a is information that includes, so to speak, initial values of teaching values for enabling the robot 10 to perform basic operations required in a teaching work. The prior teaching information 52a is previously stored in the memory unit 52 prior to a teaching work.

The first-hand teaching information 52b is information that includes teaching values for the first hand 17a generated as a result of the teaching work to the first hand 17a. The relative error information 52c is information that includes a relative error around the axis a3 between the first hand 17a and the second hand 17b, which is detected to generate teaching values for the second hand 17b from the teaching values for the first hand 17a.

The second-hand teaching information 52d is information that includes the teaching values for the second hand 17b generated from the teaching values for the first hand 17a based on the relative error.

The control unit 51 is, e.g., a central processing unit (CPU), and is configured to perform overall control of the control device 5. The operation control unit 51a controls the operations of the robot arm 14, the first hand 17a and the second hand 17b.

Specifically, when performing a teaching work to the first hand 17a, the operation control unit 51a controls the first hand 17a and the robot arm 14 through an operation signal based on the prior teaching information 52a, so that the first hand 17a and the robot arm 14 perform the operations required in carrying out the teaching work to the first hand 17a.

When detecting the relative error, the operation control unit 51a controls the first hand 17a, the second hand 17b and the robot arm 14 through an operation signal based on the prior teaching information 52a and the first-hand teaching information 52b, so that the first hand 17a, the second hand 17b and the robot arm 14 perform the operations required in carrying out the detection of the relative error.

The first generation unit 51b generates teaching values for the first hand 17a based on the detection results of the sensors ES and CS detected during the operation of the robot arm 14 in the teaching work to the first hand 17a. The first generation unit 51b stores the teaching values for the first hand 17a by having the same included in the first-hand teaching information 52b.

The error acquiring unit 51c acquires the relative error from the detection result of the center sensor CS detected when the robot arm 14 performs the operation required in detecting the relative error. The error acquiring unit 51c stores the relative error by having the same included in the relative error information 52c.

The second generation unit 51d generates teaching values for the second hand 17b from the teaching values for the first hand 17a of the first-hand teaching information 52b based on the relative error included in the relative error information 52c. The second generation unit 51d stores the teaching values for the second hand 17b by having the same included in the second-hand teaching information 52d.

Then, during the course of practical operations, the robot system 1 operates the first hand 17a and the second hand 17b based on the teaching values for the first hand 17a of the first-hand teaching information 52b and the teaching values for the second hand 17b of the second-hand teaching information 52d. That is to say, the operation control unit 51a of the control device 5 controls the operations of the robot arm 14, the first hand 17*a* and the second hand 17*b* based on the prior teaching information previously stored in the memory unit 52, the teaching values for the first hand 17*a* and the teaching values for the second hand 18*b*.

Figure 6A:
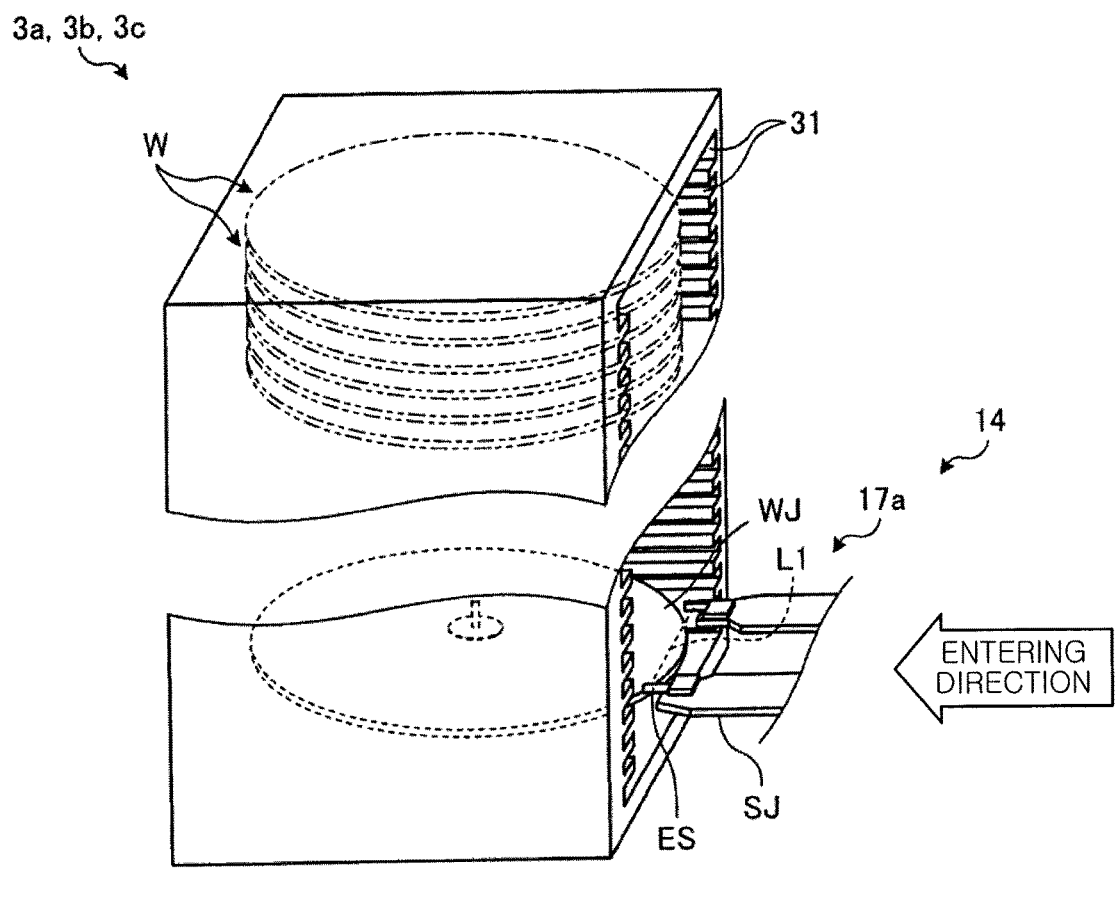
FIG. 6A is a schematic diagram illustrating an operation of a robot in a teaching work to a first hand.
Figure 6B:
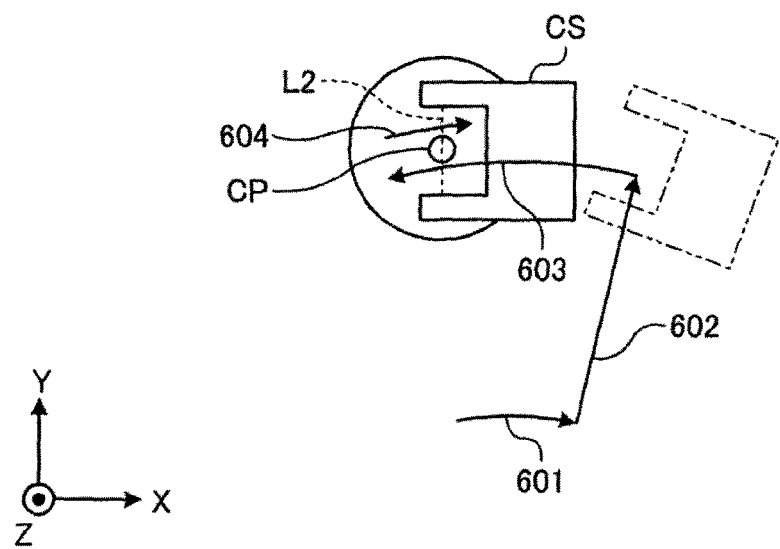
FIG. 6B is a schematic diagram illustrating another operation of the robot in the teaching work to the first hand.
Figure 6C:
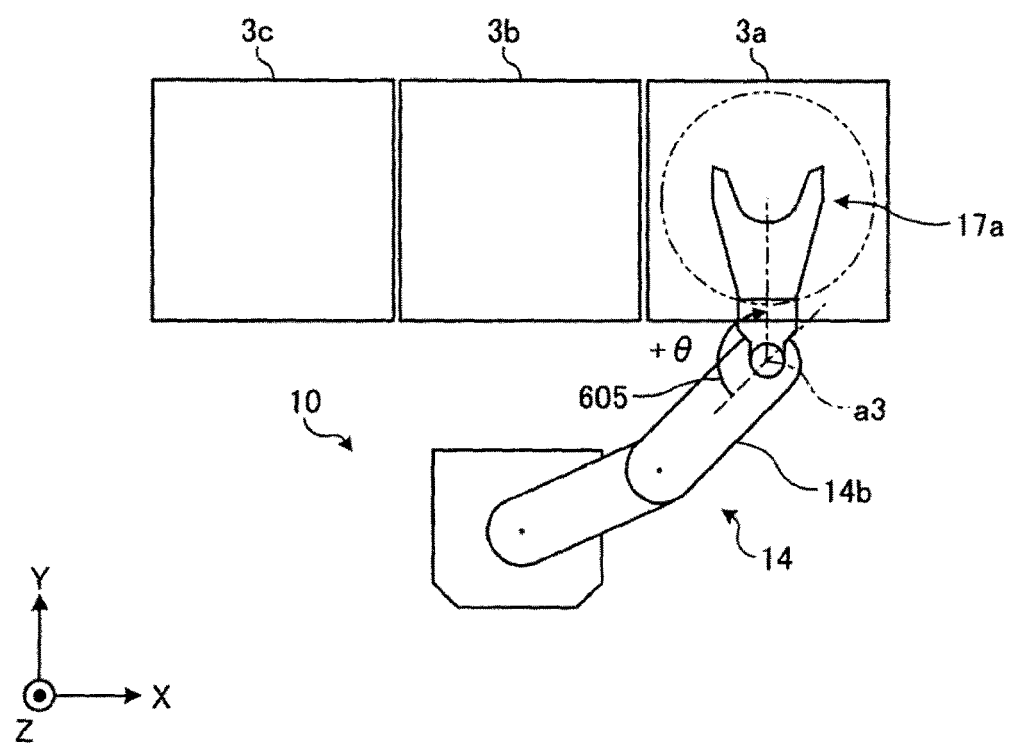
FIG. 6C is a schematic diagram illustrating still another operation of the robot in the teaching work to the first hand.

Next, on the premise of the configurations of the present embodiment described so far, the detailed operations of the robot arm 14 in the teaching work to the first hand 17*a* will be described with reference to FIGS. 6A to 6C. FIGS. 6A to 6C are schematic diagrams (first to third schematic diagrams) illustrating the operations of the robot arm 14 in the teaching work to the first hand 17*a*.

First, in FIG. 6A, there is illustrated a schematic perspective view of the FOUP 3*a*, 3*b* or 3*c* which has been described with reference to FIG. 1. The FOUPs 3*a*, 3*b* and 3*c* differ only in arrangement position and remain the same in configuration. As illustrated in FIG. 6A, the FOUP 3*a*, 3*b* or 3*c* includes a plurality of groove portions 31 which are formed to accommodate, one by one, a plurality of wafers W at multiple stages in the Z-axis direction.

In the teaching work to the first hand 17*a*, one of the groove portions 31 is defined as a desired teaching position. Similar to the wafer W, the wafer jig WJ is accommodated in another of the groove portions 31.

Then, the control device 5 allows the robot arm 14 to move along the Y-axis direction (see the entering direction in FIG. 6A) so that the first hand 17*a* equipped with the sensor jig SJ can approach the wafer jig WJ. At this time, the edge sensors ES detects an edge position of the wafer jig WJ using the optical axis L1, thereby detecting a height position at which the first hand 17*a* enters.

Subsequently, as illustrated in FIG. 6B, the control device 5 controls the robot arm 14 so that the center sensor CS A can approach the center pin CP. At this time, the control device 5 allows the robot arm 14 to enter after rotationally moving the first hand 17*a* about the axis a3 in the X-axis direction based on the prior teaching information so that the center sensor CS having a substantially U-like shape does not interfere with the center pin CP (see arrows 601 and 602 in FIG. 6B).

Then, the control device 5 rotationally moves the first hand 17*a* about the axis a3 in the left-right direction (see arrows 603 and 604 in FIG. 6B), whereby the X-axis position of the center pin CP is detected by the optical axis L2. Thus, the X-axis position of the center pin CP is detected.

Based on the posture of the robot arm 14 available when the center sensor CS has detected the center pin CP, the first generation unit 51*b* (see FIG. 5) described above generates teaching values for the first hand 17*a*.

As illustrated in FIG. 6C, the teaching values for the first hand 17*a* thus generated include a rotation amount about the axis a3 of the first hand 17*a* with respect to the extension direction of the second arm 14*b*.

As illustrated in FIG. 6C, when the robot arm 14 gains access to, for example, the FOUP 3*a* existing in the positive side of the X axis with respect to the robot 10, it is preferred that the hands 17 including the first hand 17*a* are rotated clockwise in order to avoid interference (see an arrow 605 in FIG. 6C). That is to say, in the present embodiment, depending on the posture of the robot arm 14 corresponding to each of the teaching positions, the hands 17 are rotated clockwise or counterclockwise.

In order to facilitate understanding of this point, in the following descriptions, as illustrated in FIG. 6C, symbol "+" is attached to the rotation amount θ in the case where the hands 17 are rotated clockwise. Conversely, symbol "−" is attached to the rotation amount θ in the case where the hands 17 are rotated counterclockwise.

The actual rotation amounts of the first hand 17*a* and the second hand 17*b* may differ from each other even if the control device 5 rotates the first hand 17*a* and the second hand 17*b* based on the same teaching values (operation signals) which direct the first hand 17*a* and the second hand 17*b* to rotate in the same direction and at the same rotation amount (e.g., +θ). Further, the difference in the rotation amounts may occur depending on whether the rotation direction is clockwise or counterclockwise.

In view of this point, detailed operations of the robot arm 14 when detecting the relative error will now be described with reference to FIGS. 7A to 7G. FIGS. 7A to 7G are schematic diagrams (first to seventh schematic diagrams) illustrating the operations of the robot arm 14 when detecting the relative error between the first hand 17*a* and the second hand 17*b*.

With regard to FIGS. 7C to 7E, descriptions will be made on the assumption that, as illustrated in FIG. 6C, the prior teaching work to the first hand 17*a* is performed using as a target, the desired teaching position in the FOUP 3*a*. That is to say, in FIGS. 7C to 7E, the rotation amount around the axis a3 of the first hand 17*a* included in the teaching values for the first hand 17*a* is "+θ" as illustrated in FIG. 6C.

Figure 7A:
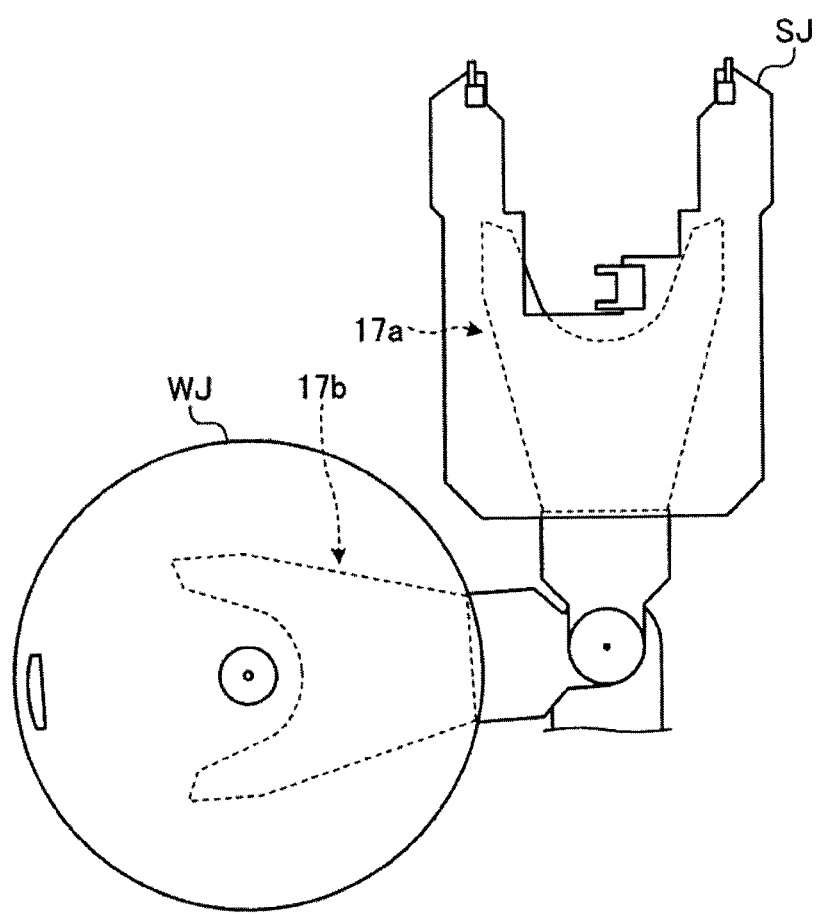
FIG. 7A is a schematic diagram illustrating a first operation of a robot when detecting a relative error between a first hand and a second hand.

First, as illustrated in FIG. 7A, when detecting the relative error between the first hand 17*a* and the second hand 17*b*, the sensor jig SJ is mounted to the first hand 17*a* and the wafer jig WJ is mounted to the second hand 17*b*. At this time, the wafer jig WJ is positioned in and mounted to the prescribed position of the wafer W on the second hand 17*b*.

In FIGS. 7B to 7G, in order to facilitate understanding of the drawings, illustration of the sensor jig SJ and the wafer jig WJ is omitted.

Furthermore, when detecting the relative error, the control device 5 allows the robot arm 14 to take a first posture differing from a second posture of the robot arm 14 available when the first hand 17*a* has reached a desired teaching position. Thereafter, the control device 5 rotates the first hand 17*a* and the second hand 17*b*.

That is to say, the first hand 17*a* and the second hand 17*b* are not rotated within the FOUP 3*a*, 3*b* or 3*c* or at a narrow location. It is therefore possible to perform a relative error detecting work while avoiding interference with the surroundings.

Figure 7B:
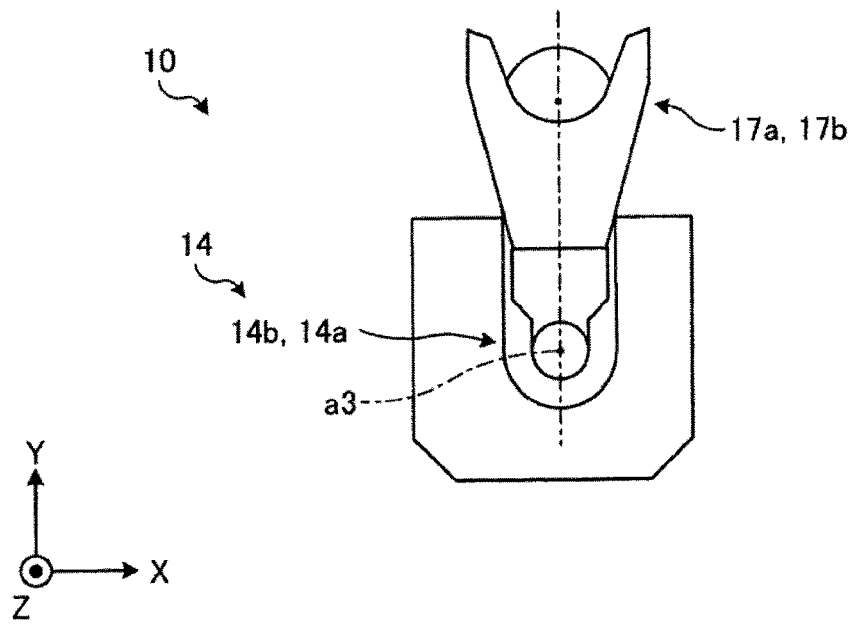
FIG. 7B is a schematic diagram illustrating a second operation of the robot when detecting the relative error between the first hand and the second hand.

As one example of the differing posture, the control device 5 allows the robot arm 14 to take a folded posture so that, as illustrated in FIG. 7B, the extension directions of the first arm 14*a* and the second arm 14*b* overlap with each other.

Accordingly, it is possible to perform the detection of the relative error in a safe posture in which the first arm 14*a* and the second arm 14*b* hardly interfere with the surroundings even if the robot arm 14 is swiveled. Furthermore, it is possible to reduce the influence of the gravity on the deflection of the robot arm 14. This makes it possible to accurately detect the relative error.

In FIG. 7B, there is illustrated, as an example, a case where the first arm 14*a* and the second arm 14*b* overlap with each other substantially in their entirety. However, one example of the differing posture is not limited thereto but may be a posture in which the first arm 14*a* and the second arm 14*b* partially overlap with each other.

Furthermore, as initial positions of the first hand 17*a* and the second hand 17*b* for the detection of the relative error, the control device 5 brings the first hand 17*a* and the second hand 17*b* to overlap in a plan view with the first arm 14*a* and the second arm 14b by rotating the first hand 17a and the second hand 17b about the axis a3.

Figure 7C:
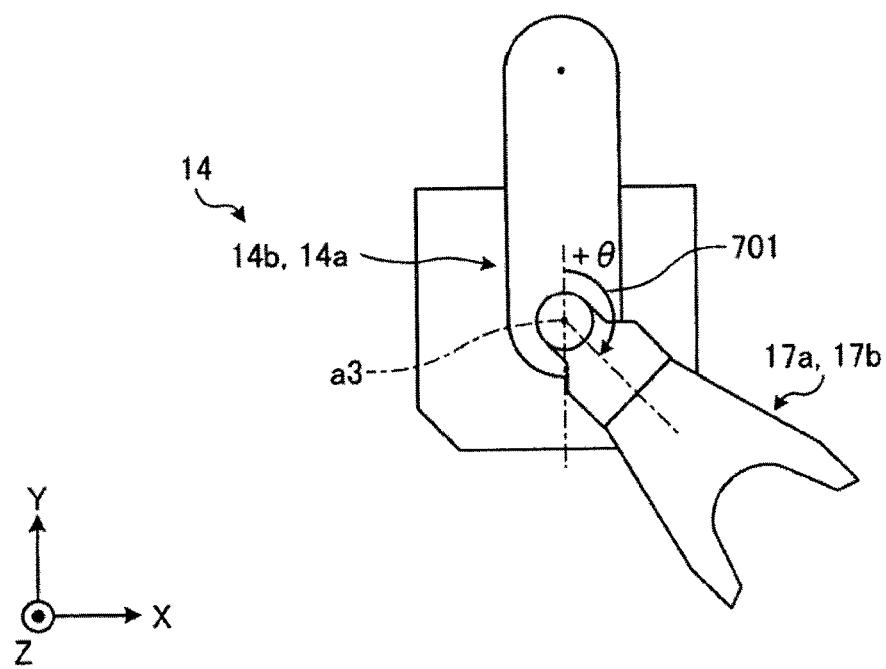
FIG. 7C is a schematic diagram illustrating a third operation of the robot when detecting the relative error between the first hand and the second hand.

Subsequently, as illustrated in FIG. 7C, the control device 5 rotates both the first hand 17a and the second hand 17b with respect to the second arm 14b based on the teaching values (operation signals) which intend the first hand 17a and the second hand 17b to rotate about the axis a3 at a rotation amount of "+e" (see an arrow 701 in FIG. 7C). That is to say, the first hand 17a and the second hand 17b are rotated together by the previously-generated teaching values of the first hand 17a.

At this time, the control device 5 may allow the robot 10 to rotate the first hand 17a and the second hand 17b either simultaneously or at different timings. In the case of rotating the first hand 17a and the second hand 17b at different timings, it is preferable to rotate the first hand 17a and the second hand 17b so that the center sensor CS of the sensor jig SJ does not interfere with the center pin CP of the wafer jig WJ.

Figure 7D:
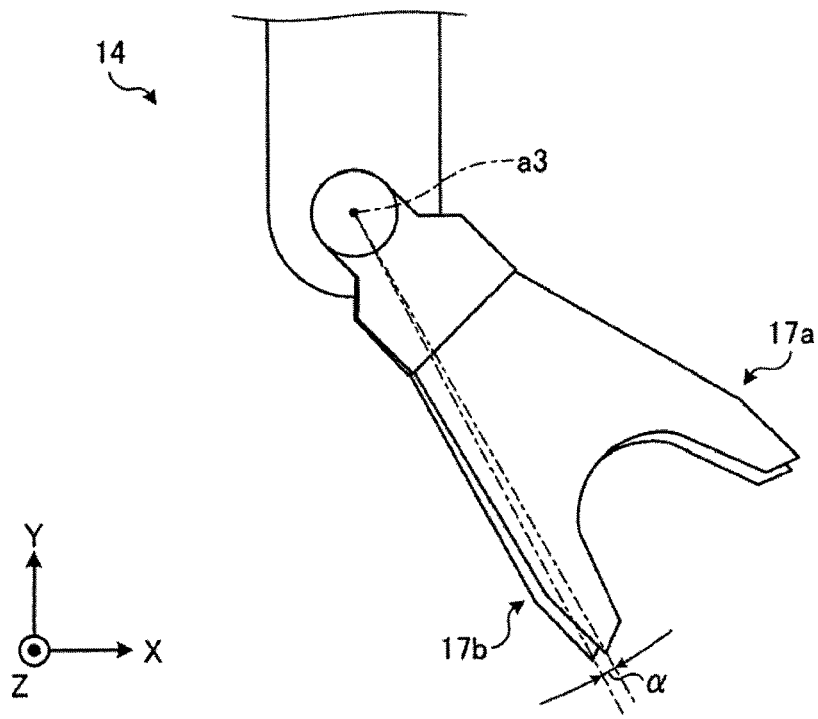
FIG. 7D is a schematic diagram illustrating a fourth operation of the robot when detecting the relative error between the first hand and the second hand.

Even if the first hand 17a and the second hand 17b are intended to be rotated in the same direction and at the same rotation amount based on the teaching values for the first hand 17a as described above, a relative error "α" in actual rotation amount between the first hand 17a and the second hand 17b may occur as illustrated in FIG. 7D.

In the example illustrated in FIG. 7D, the relative error "α" has occurred since the second hand 17b has been further shifted clockwise by an amount of "α" with respect to the first hand 17a. Thus, in the following descriptions, the relative error "α" will be referred to as "+α".

Figure 7E:
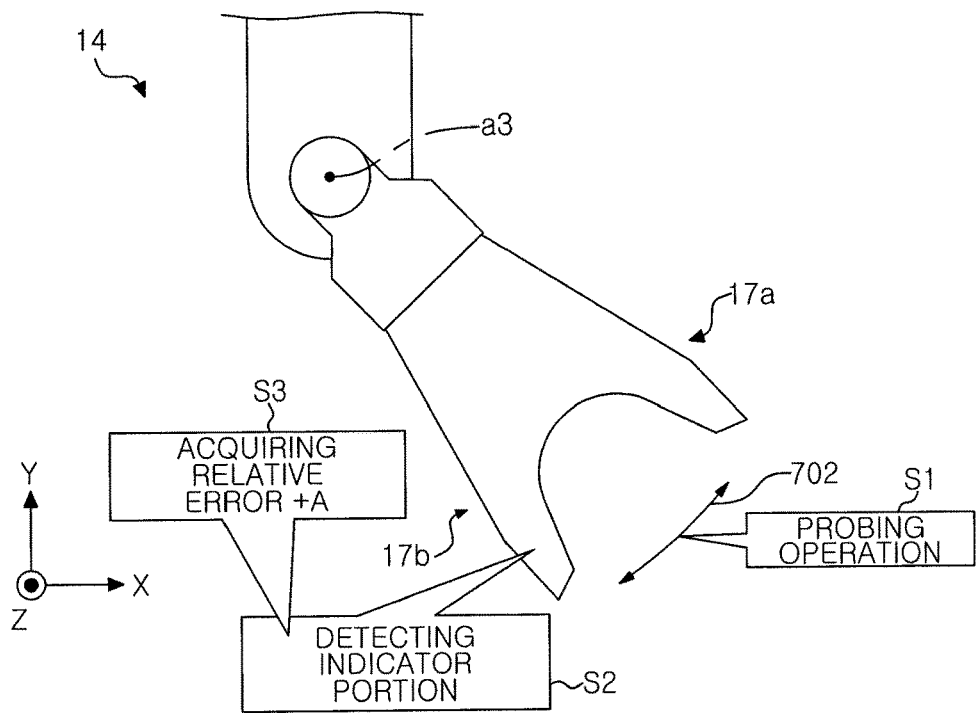
FIG. 7E is a schematic diagram illustrating a fifth operation of the robot when detecting the relative error between the first hand and the second hand.

Then, as illustrated in FIG. 7E, the control device 5 allows the first hand 17a to perform a "probing operation" in order to enable the sensor jig SJ (not illustrated in FIG. 7E) to detect the relative error "α" (see step S1).

The "probing operation" means an operation by which the indicator portion (i.e., the center pin CP) of the wafer jig WJ (not illustrated in FIG. 7E) is probed by rotating, little by little, the first hand 17a clockwise or counterclockwise about the axis a3 with respect to the second hand 17b (see an arrow 702 in FIG. 7E). In the example described above, the "probing operation" corresponds to the motion indicated by arrows 603 and 604 in FIG. 6B.

If the indicator portion is detected by the center sensor CS of the sensor jig SJ through the probing operation (step S2), i.e., if it is detected that the first hand 17a and the second hand 17b completely overlap with each other in the vertical direction, the error acquiring unit 51c (see FIG. 5) acquires a relative error "+α" based on the detection result, namely the rotation amount of the first hand 17a detected in the probing operation (step S3). The error acquiring unit 51c stores the relative error "+α" by having the same included in the relative error information 52c.

Then, the second generation unit 51d (see FIG. 5) calculates, e.g., "−α" from the teaching values for the first hand 17a based on the relative error "+α", thereby generating the teaching values for the second hand 17b.

With regard to FIGS. 7C to 7E, descriptions have been made on the assumption that the prior teaching work to the first hand 17a is performed using as a target, the desired teaching position in the FOUP 3a. As described above, it is usual that, even if the first hand 17a and the second hand 17b are rotated based on the teaching values which direct the first hand 17a and the second hand 17b to rotate at the same rotation amount, the magnitude of the relative error in actual rotation amount between the first hand 17a and the second hand 17b varies depending on whether the first hand 17a and the second hand 17b have been rotated clockwise or counterclockwise.

Figure 7F:
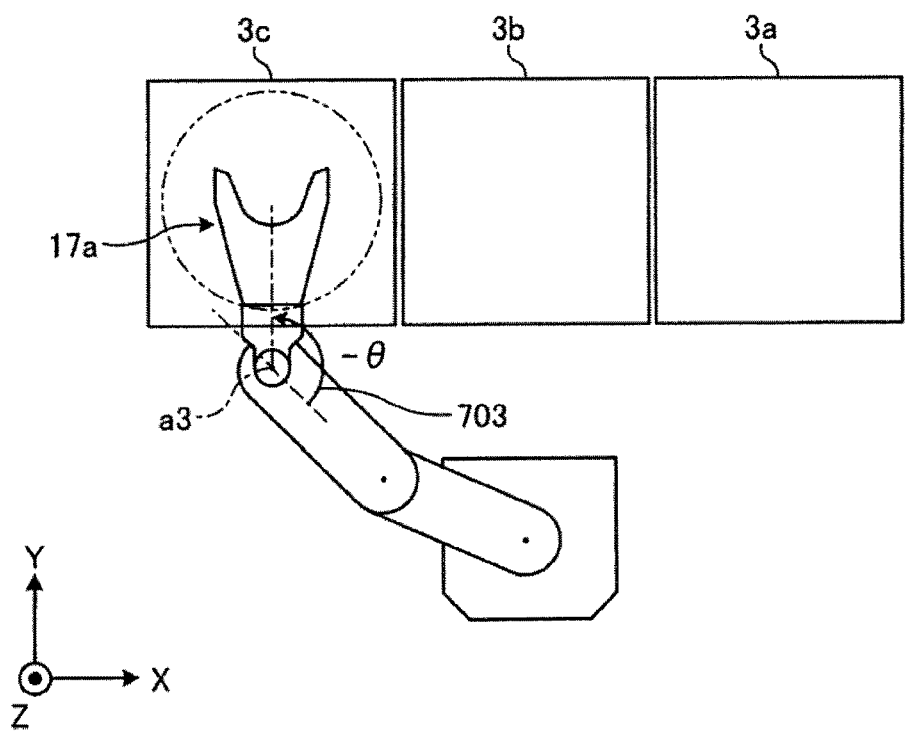
FIG. 7F is a schematic diagram illustrating a sixth operation of the robot when detecting the relative error between the first hand and the second hand.

Thus, descriptions will be made on a case where, as illustrated in FIG. 7F, the prior teaching work to the first hand 17a is performed using, as a target, the desired teaching position in the FOUP 3c existing at the opposite side from the FOUP 3a. It is assumed that the rotation amount around the axis a3 of the first hand 17a generated by the teaching work to the first hand 17a in this case is "−θ" (see an arrow 703 in FIG. 7F).

Figure 7G:
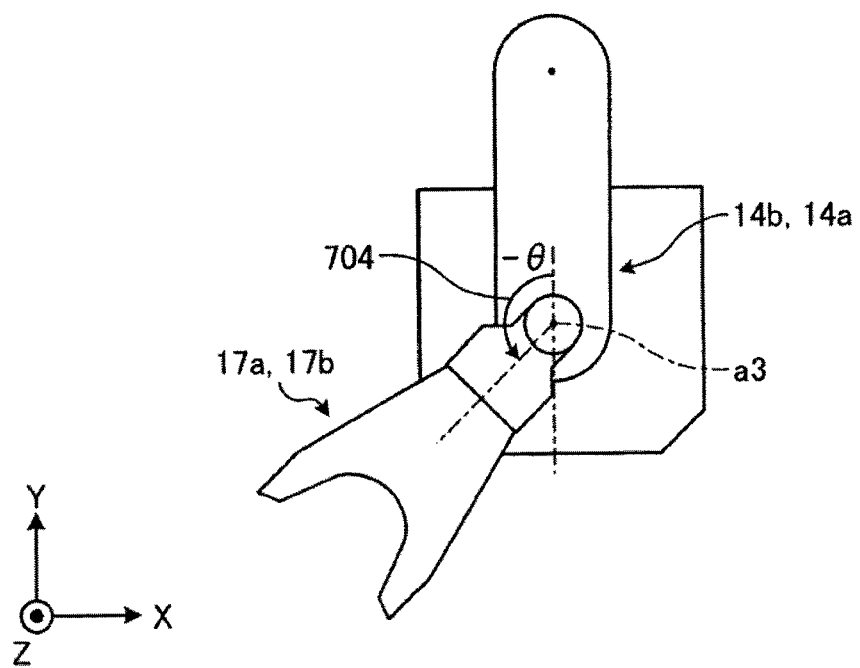
FIG. 7G is a schematic diagram illustrating a seventh operation of the robot when detecting the relative error between the first hand and the second hand.

In the case, the control device 5 allows the robot arm 14 to take a posture differing from a posture available when the first hand 17a has reached the desired teaching position in the FOUP 3c (see FIG. 7B). Then, as illustrated in FIG. 7G, the control device 5 rotates both the first hand 17a and the second hand 17b about the axis a3 at a rotation amount of "−θ" with respect to the second arm 14b (see an arrow 704 in FIG. 7G).

As for the relative error generated at the rotation amount of "−θ", the control unit 51 allows the first hand 17a to perform the same probing operation as illustrated in FIG. 7E. The relative error corresponding to the rotation amount of "−θ" is detected. Thus, the error acquiring unit 51c of the control device 5 acquires the relative error.

As described above, in the present embodiment, even when the relative error is detected depending on the rotation direction and the rotation amount of the first hand 17a available when the first hand 17a has reached each of the teaching positions, the control device 5 rotates both the first hand 17a and the second hand 17b in the same direction and at the same rotation amount as mentioned above.

Accordingly, it is possible to individually compensate for the respective relative errors available when the hands are rotated clockwise or counterclockwise. This may contribute to performing an accurate teaching work.

In the present embodiment, if a plurality of FOUPs 3a, 3b and 3c exists as teaching positions as illustrated in FIG. 7F, the teaching values for the first hand 17a are individually generated with respect to the respective FOUPs 3a, 3b and 3c. The relative errors corresponding to the respective teaching values thus generated are individually detected and acquired. The teaching values for the second hand 17b are individually generated based on the respective relative errors thus acquired.

Accordingly, it is possible to individually compensate for the respective relative errors available when the hands are rotated clockwise or counterclockwise according to the respective teaching positions. This may contribute to performing an accurate teaching work.

Even when there is a plurality of teaching positions, it is not necessary to individually teach both the first hand 17a and the second hand 17b with respect to all the teaching positions. It is therefore possible to efficiently perform a teaching work.

Figure 8:
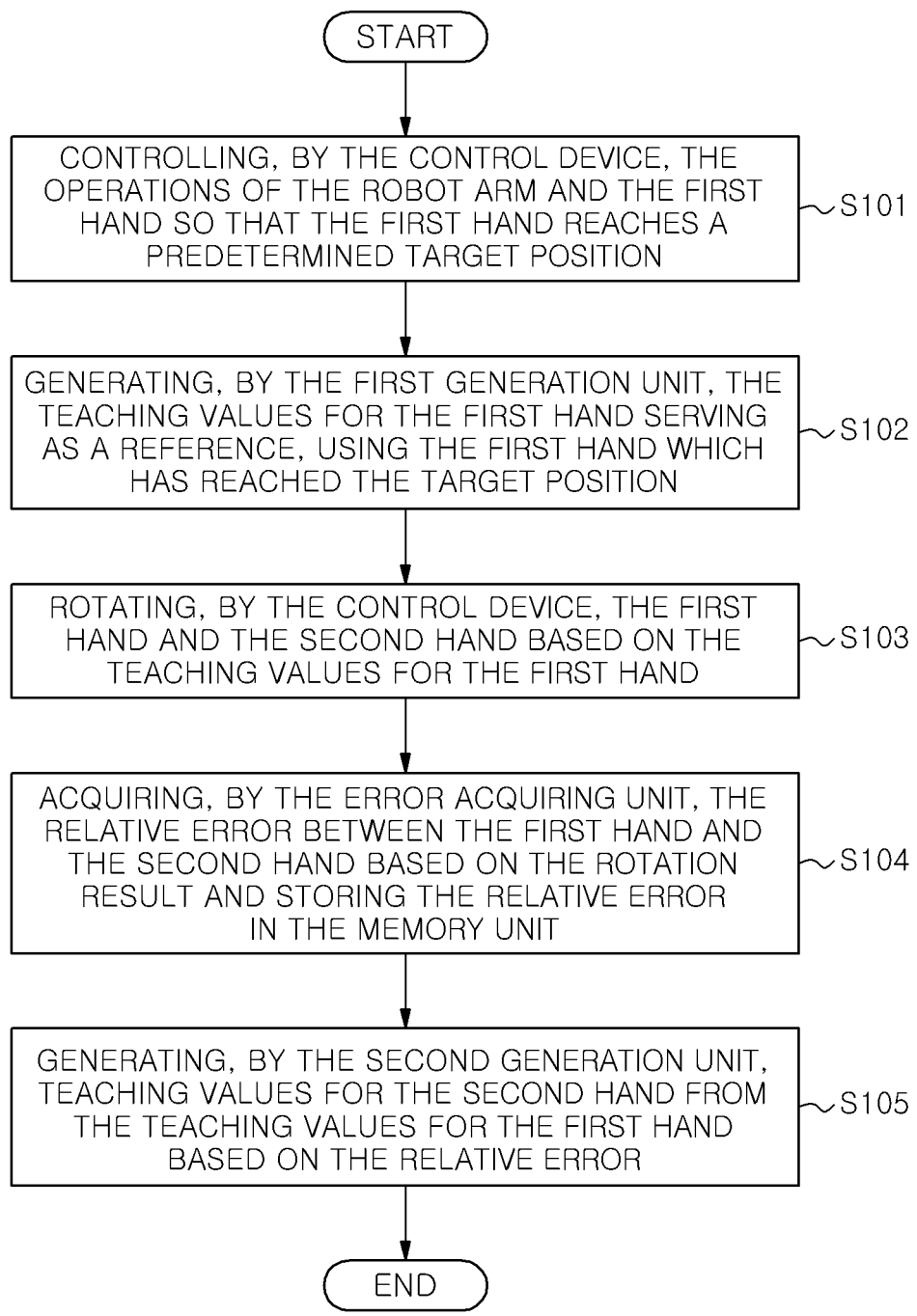
FIG. 8 is a flowchart illustrating a processing sequence executed by the robot system according to the first embodiment.

Next, a processing sequence executed by the robot system 1 according to the first embodiment will be described with reference to FIG. 8. FIG. 8 is a flowchart illustrating a processing sequence executed by the robot system 1 according to the first embodiment.

As illustrated in FIG. 8, the control device 5 (specifically, the operation control unit 51a) controls the operations of the robot arm 14 and the first hand 17a so that the first hand 17a reaches a predetermined target position (step S101).

Then, the first generation unit 51b generates the teaching values for the first hand 17a serving as a reference based on the movements of the robot arm 14 and the first hand 17a until the first hand 17a reaches the target position (step S102).

Subsequently, the control device 5 (the operation control unit 51a) rotates the first hand 17a and the second hand 17b based on the teaching values for the first hand 17a generated as above (step S103). That is to say, the control device 5 (the operation control unit 51a) rotates the first hand 17a and the second hand 17b based on the teaching values which direct the first hand 17a and the second hand 17b to rotate at the same rotation amount and in the same direction.

Then, the error acquiring unit 51c acquires a relative error in rotation amount around the axis a3 between the first hand 17a and the second hand 17b based on the rotation results at step S103 and stores the relative error in the memory unit 52 (step S104).

Then, the second generation unit 51d generates teaching values for the second hand 17b from the teaching values of the first hand 17a based on the stored relative error (step S105). Thus, the processing is terminated.

As described above, the robot system 1 according to the first embodiment includes a robot 10 and a control device 5 (controller). The robot 10 includes a robot arm 14, and a first hand 17a and a second hand 17 b (and other hands) which are connected to the robot arm 14 and which are configured to independently rotate about an axis a3 on the robot arm 14. The control device 5 controls the operation of the robot 10.

The control device includes a first generation unit 51b, an error acquiring unit 51c and a second generation unit 51d. When the robot arm 14 and the first hand 17a are operated so that the first hand 17a reaches a predetermined target position, the first generation unit 17a generates teaching values for the first hand 17a in the target position.

The error acquiring unit 51c acquires a relative error in rotation amount around the common axis between the first hand 17a and the second hand 17b and stores the relative error in a memory unit 52. The second generation unit 51d generates teaching values for the second hand 17b from the teaching values for the first hand 17a based on the relative error.

Thus, according to the robot system 1 of the first embodiment, it is possible to efficiently perform a teaching work.

Descriptions have been made so far by taking, as an example, a case where a teaching work is performed. The teaching work may be performed prior to shipment of the robot system or may be performed prior to a practical operation after shipment and local introduction of the robot system.

In the case of performing the teaching work prior to shipment of the robot system, the teaching work may be performed by the aforementioned method by, for example, actually fabricating a configuration for a practical operation and then using an actual target position, e.g., the FOUP 3a, 3b or 3c (see FIG. 1), as a teaching position.

Furthermore, in the case of performing the teaching work prior to shipment of the robot system, for example, the relative errors between the first hand 17a and the second hand 17b (see FIG. 1) available when the rotation amount ranges from 0 to 360 degrees may be detected in advance without having to temporarily fabricating a configuration for a practical operation. The relative errors thus detected may be stored as the relative error information 52c (see FIG. 5) in a database.

Specifically, the relative errors between the first hand 17a and the second hand 17b may be detected at least 720 times by changing the rotation amount, 1 degree by 1 degree, in the clockwise rotation and the counterclockwise rotation, respectively. The relative errors thus detected may be previously stored as the relative error information 52c in a database prior to shipment of the robot system.

In this case, the teaching work may be performed after shipment and local introduction of the robot system 1. For example, if the teaching values for the first hand 17a are determined, the teaching values for the second hand 17b may be generated from the teaching values for the first hand 17a based on the prior relative error information 52c.

If the allocation of the teaching work before and after shipment of the robot system or the prior storage of the relative error information 52c in a database is made optionally selectable, it becomes possible to provide a robot system capable of performing an efficient teaching work in conformity with the operation and configuration employed by an end-user.

During the practical operation, a change in the relative error may be acquired at a predetermined timing to monitor the over-time degradation of mechanical elements existing around the axis a3 (see FIG. 1), for example, a drive power source such as a motor or the like and a rotation transfer mechanism such as a pulley or a belt. This will be described as a second embodiment with reference to FIG. 9.

Second Embodiment

Figure 9:
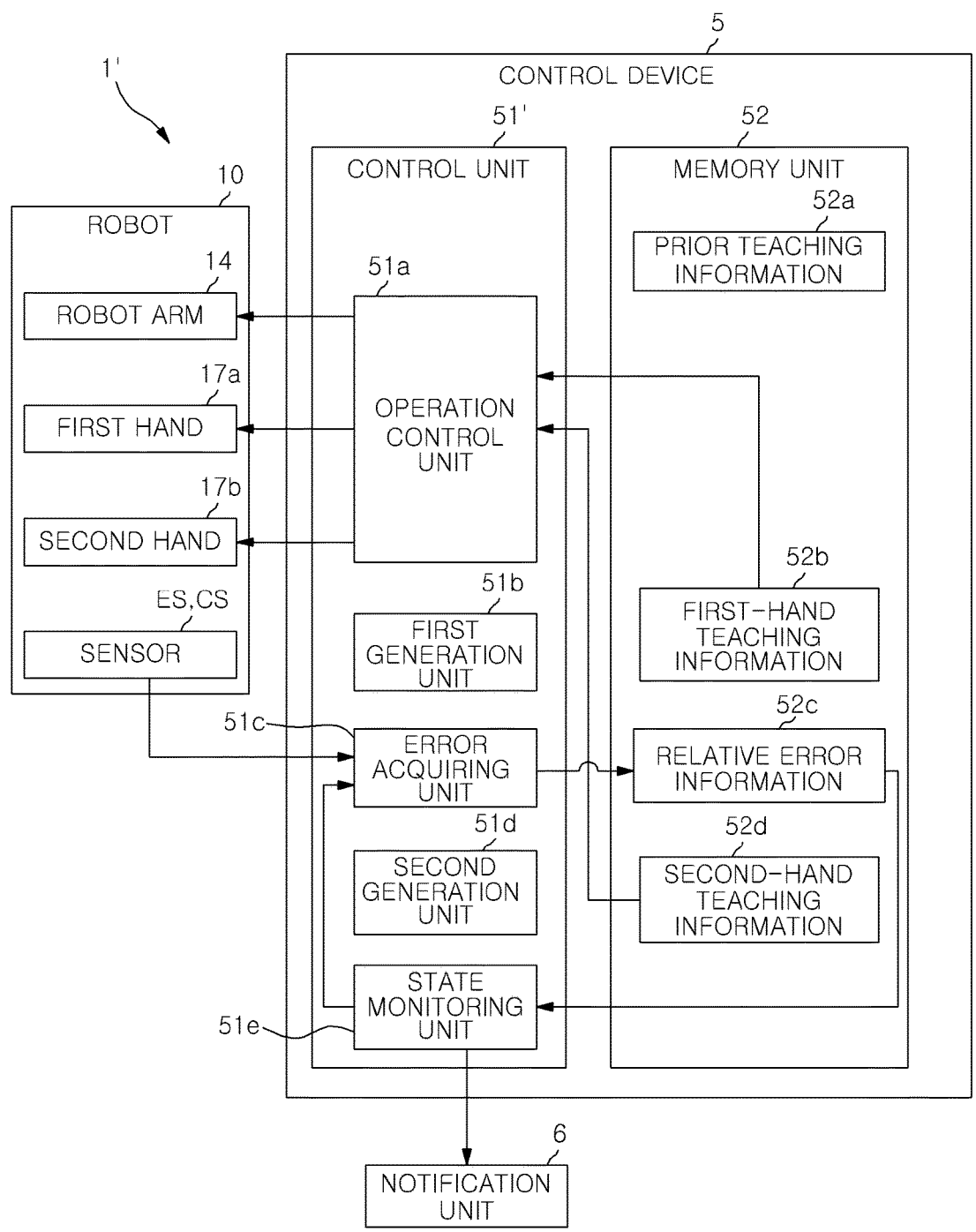
FIG. 9 is a block diagram of a robot system according to a second embodiment.

FIG. 9 is a block diagram of a robot system 1' according to a second embodiment. FIG. 9 corresponds to FIG. 5. In the second embodiment, only the components differing from those of the first embodiment will be described.

In the block diagram illustrated in FIG. 9, block lines interconnecting the respective function blocks indicate the actions between the respective function blocks during a practical operation. Thus, block lines indicating the actions during the teaching work illustrated in FIG. 5 is omitted.

As illustrated in FIG. 9, the robot system 1' according to the second embodiment differs from the robot system 1 according to the first embodiment in that the robot system 1' further includes a notification unit 6 a state monitoring unit 51e included in a control unit 51'.

For example, during the practical operation, the state monitoring unit 51e allows the error acquiring unit 51c to acquire a relative error between the first hand 17a and the second hand 17b at a predetermined timing. Furthermore, the state monitoring unit 51e monitors the over-time degradation of the mechanical elements existing around the axis a3, based on a difference between the relative error acquired at the predetermined timing by the error acquiring unit 51c and the relative error having been stored in the relative error information 52c prior to the practical operation.

If the over-time degradation of the mechanical elements is detected, the state monitoring unit 51e informs the detection result to the notification unit 6 which is a notifying device. The notification unit 6 notifies an operator of, e.g., the fact that maintenance is needed due to the over-time degradation of the mechanical elements.

When allowing the error acquiring unit 51c to acquire the relative error between the first hand 17a and the second hand 17b at the predetermined timing, for example, sensors ES and CS may be previously provided in the first hand 17a without the sensor jig SJ of FIG. 4C being provided to the first hand 17a.

The wafer jig WJ (see FIG. 4A) may be basically accommodated in a predetermined position within one of the FOUPs 3a, 3b and 3c. When detecting the relative error, the wafer jig WJ may be mounted to the second hand 17b by the operation of the robot arm 14.

The sensor jig SJ and the wafer jig WJ may be manually mounted without resort to automation. The monitoring process may be performed by applying trigger to the state monitoring unit 51e.

By detecting the difference between the relative error acquired at the predetermined timing by the error acquiring unit 51c and the relative error having been stored in the relative error information 52c prior to the practical operation as mentioned above, it is possible to improve not only the efficiency of the teaching work but also the maintainability.

As described above, the robot system according to the second embodiment further includes a state monitoring unit. The state monitoring unit allows the error acquiring unit to acquire the relative error at a predetermined timing.

Thus, according to the robot system according to the second embodiment, it is possible to improve not only the efficiency of the teaching work but also the maintainability.

In the respective embodiments described above, descriptions have been made to the effect that the number of hands is not limitative, by taking, as an example, two hands, i.e., a first hand and a second hand, which are capable of independently rotating about a common axis. Additionally speaking in this regard, it is preferred that the hand serving as a reference is single. Accordingly, the teaching values of other hands are generated from the teaching values of the hand serving as the reference, based on the relative error.

Furthermore, in the respective embodiments described above, descriptions have been made by taking, as an example, a case where the first hand existing at the upper side becomes the hand serving as the reference. As an alternative example, the second hand existing at the lower side may serve as the reference. In this case, the sensor jig is mounted to the second hand, and the wafer jig is mounted to the first hand so that the center pin thereof faces downward.

Furthermore, in the respective embodiments described above, descriptions have been made by taking, as an example, a single-arm robot. However, the present disclosure may be applied to a multiple-arm robot having two or more arms as long as the multiple-arm robot includes a plurality of hands capable of independently rotating about a common axis.

Furthermore, in the respective embodiments described above, descriptions have been made by taking, as an example, a case where the transferred object is a wafer. However, the present disclosure is not limited thereto. In the case where a workpiece other than the wafer is used as the transferred object, it is preferred that the jig corresponding to the wafer jig is formed in a shape conforming to the shape of the workpiece which becomes the transferred object.

Furthermore, in the respective embodiments described above, descriptions have been made by taking, as an example, a case where the robot is a substrate transfer robot which transfers a substrate such as a wafer or the like. Alternatively, the robot may be a robot which performs a work other than the transfer work. For example, the robot may be an assembling robot which performs a predetermined assembling work while maintaining the relative position of the workpieces held by a plurality of hands capable of independently rotating about a common axis.

In addition, the number of axes of the robot is not limited by the respective embodiments described above.

Other effects and other modifications can be readily derived by those skilled in the art. For that reason, the broad aspect of the present disclosure is not limited to the specific disclosure and the representative embodiments shown and described above. Accordingly, the present disclosure can be modified in many different forms without departing from the spirit and scope defined by the appended claims and the equivalents thereof.

What is claimed is:

1. A robot system, comprising:
a robot including a robot arm, and a first hand and a second hand which are connected to the robot arm and which are provided to independently rotate about an axis on the robot arm; and
a controller configured to control an operation of the robot,
wherein the controller includes:
a memory unit;
a first generation unit configured to, when the robot arm and the first hand are operated so that the first hand reaches a predetermined target position, generate teaching values for the first hand in the target position;
an error acquiring unit configured to, when the first hand and the second hand are rotated based on the teaching values for the first hand, acquire a relative error in rotation amount around the axis between the first hand and the second hand and store the acquired relative error in the memory unit; and
a second generation unit configured to generate teaching values for the second hand from the teaching values for the first hand based on the acquired relative error.

2. The robot system of claim 1, wherein the first hand includes a sensor,
the second hand includes an indicator portion which is detectable by the sensor of the first hand, and
the controller is configured to allow the error acquiring unit to acquire the relative error, by rotating the second hand and the first hand based on a rotation amount value around the axis, which is included in the teaching values for the first hand, and then rotating the first hand with respect to the second hand until the indicator portion is detected by the sensor.

3. The robot system of claim 2, wherein the controller is configured to allow the error acquiring unit to acquire the relative error, by operating the robot arm so as to take a first posture differing from a second posture of the robot arm, the second posture being a posture taken by the robot arm when the first hand reaches the target position, and then rotating the second hand and the first hand based on the teaching values for the first hand.

4. The robot system of claim 3, wherein the robot arm includes a pivot joint, and a first arm and a second arm which are serially connected to each other through the pivot joint, and
the first posture is a posture in which the first arm and the second arm are folded by the pivot joint so as to overlap with each other.

5. The robot system of claim 4, wherein the first hand and the second hand are provided at a free end side of the second arm which is a tip side of the robot arm, and
the rotation amount around the axis is defined by rotation angles of the first hand and the second hand with respect to an extended direction of the second arm.

6. The robot system of claim 4, wherein the controller is configured to allow the error acquiring unit to acquire the relative error, by rotating the first hand and the second hand clockwise or counterclockwise in accordance with a rotation direction of the first hand when the first hand has reached the target position.

7. The robot system of claim 1, wherein the target position includes a plurality of target positions, the first generation unit is configured to individually generate teaching values for the first hand with respect to the respective target positions, the error acquiring unit is configured to individually acquire relative errors corresponding to the respective teaching values for the first hand and to store the relative errors in the memory unit, and the second generation unit is configured to individually generate teaching values for the second hand based on the respective relative errors.

8. The robot system of claim 2, further comprising:
a detected jig provided to be mounted to the second hand and provided with the indicator portion.

9. The robot system of claim 2, further comprising:
a detecting jig provided to be mounted to the first hand and provided with the sensor.

10. The robot system of claim 8, further comprising:
a detecting jig provided to be mounted to the first hand and provided with the sensor.

11. The robot system of claim 1, wherein the controller further includes a state monitoring unit configured to allow the error acquiring unit to acquire the relative error at a predetermined timing.

12. The robot system of claim 2, wherein the controller further includes a state monitoring unit configured to allow the error acquiring unit to acquire the relative error at a predetermined timing.

13. The robot system of claim 3, wherein the controller further includes a state monitoring unit configured to allow the error acquiring unit to acquire the relative error at a predetermined timing.

14. The robot system of claim 4, wherein the controller further includes a state monitoring unit configured to allow the error acquiring unit to acquire the relative error at a predetermined timing.

15. The robot system of claim 5, wherein the controller further includes a state monitoring unit configured to allow the error acquiring unit to acquire the relative error at a predetermined timing.

16. The robot system of claim 1, wherein the controller further includes an operation control unit configured to control operations of the robot arm, the first hand and the second hand, based on prior teaching information previously stored in the memory unit, the teaching values for the first hand and the teaching values for the second hand.

17. A robot teaching method for teaching a robot including a robot arm, and a first hand and a second hand which are connected to the robot arm and which are provided to independently rotate about an axis on the robot arm, the method comprising:

generating teaching values for the first hand in a predetermined target position by operating the robot arm and the first hand so that the first hand reaches the predetermined target position, rotating, based on the teaching values for the first hand, the first hand and the second hand, acquiring a relative error in rotation amount around the axis between the first hand and the second hand, and storing the acquired relative error, and generating teaching values for the second hand from the teaching values for the first hand based on the acquired relative error.

18. The method of claim 17, wherein the second hand includes an indicator portion which is detectable by a sensor provided in the first hand, and said acquiring the relative error includes rotating the first hand with respect to the second hand until the indicator portion is detected by the sensor.

19. The method of claim 17, wherein before said rotating, the robot arm is operated so as to take a first posture differing from a second posture of the robot arm, the second posture being a posture taken by the robot arm when the first hand has reached the target position and then the second hand and the first hand are rotated based on the teaching values for the first hand.

20. A control device for controlling an operation of a robot including a robot arm, and a first hand and a second hand which are connected to the robot arm and which are provided to independently rotate about an axis on the robot arm, the control device comprising:

a storage means; and a control means, wherein the control means includes:

a first generation unit configured to, when the robot arm and the first hand are operated so that the first hand reaches a predetermined target position, generate teaching values for the first hand in the target position;

an error acquiring unit configured to, when the first hand and the second hand are rotated based on the teaching values for the first hand, acquire a relative error in rotation amount around the axis between the first hand and the second hand and store the acquired relative error in the storage means; and a second generation unit configured to generate teaching values for the second hand from the teaching values for the first hand based on the acquired relative error.

* * * * *